US009766535B2

(12) United States Patent
Candry et al.

(10) Patent No.: US 9,766,535 B2
(45) Date of Patent: Sep. 19, 2017

(54) DISPLAY SYSTEMS AND METHODS EMPLOYING WAVELENGTH MULTIPLEXING OF COLORS

(71) Applicant: Barco, Inc., Rancho Cordova, CA (US)

(72) Inventors: Patrick Candry, Kuurne (BE); Bart Maximus, Kuurne (BE); Scott Stremple, Rancho Cordova, CA (US)

(73) Assignee: Barco, Inc., Rancho Cordova, CA (US)

( * ) Notice: Subject to any disclaimer, the term of this patent is extended or adjusted under 35 U.S.C. 154(b) by 93 days.

(21) Appl. No.: 14/804,695

(22) Filed: Jul. 21, 2015

(65) Prior Publication Data

US 2016/0088271 A1   Mar. 24, 2016

Related U.S. Application Data

(60) Provisional application No. 62/027,659, filed on Jul. 22, 2014.

(51) Int. Cl.
*G03B 21/56* (2006.01)
*G09G 3/16* (2006.01)
(Continued)

(52) U.S. Cl.
CPC .............. *G03B 21/567* (2013.01); *G02B 1/11* (2013.01); *G02B 5/003* (2013.01); *G02B 5/0284* (2013.01);
(Continued)

(58) Field of Classification Search
CPC ........ G02B 1/11; G02B 5/003; G02B 5/0284; G02B 5/0294; G02B 5/09; G02B 5/285;
(Continued)

(56) References Cited

U.S. PATENT DOCUMENTS

| 4,679,069 A | 7/1987 | Andrea et al. |
| 5,137,450 A | 8/1992 | Thomas |

(Continued)

FOREIGN PATENT DOCUMENTS

| CN | 101303456 | 11/2008 |
| CN | 101888565 | 11/2010 |

(Continued)

OTHER PUBLICATIONS

PCT Search Report and Written opinion for PCT/US15/41299 mailed Jan. 12, 2016 in 16 pages.

(Continued)

*Primary Examiner* — Sultan Chowdhury
*Assistant Examiner* — Magda Cruz
(74) *Attorney, Agent, or Firm* — Knobbe, Martens, Olson & Bear, LLP (57) ABSTRACT

An immersive display system is disclosed that includes screens configured to mitigate reduction in contrast ratio due at least in part to peripheral light incident on the screens. The immersive display system includes at least two screens and at least two projector systems. The screens have a multi-layered structure configured to selectively reflect light in narrow wavelength bands. Each screen is configured to strongly diffusely reflect light in narrow wavelength bands that are different from the wavelength bands reflected by other screens in the immersive display system. Projector systems can be configured to provide light to associated screens in the narrow wavelength bands reflected by those screens.

19 Claims, 5 Drawing Sheets

(51) Int. Cl.

| | | |
|---|---|---|
| *G02B 1/11* | (2015.01) | |
| *G02B 5/00* | (2006.01) | |
| *G02B 5/02* | (2006.01) | |
| *G02B 5/09* | (2006.01) | |
| *G02B 5/28* | (2006.01) | |
| *G03B 21/60* | (2014.01) | |
| *G03B 21/602* | (2014.01) | |
| *H04N 9/31* | (2006.01) | |
| *G09G 3/00* | (2006.01) | |

(52) U.S. Cl.
CPC .............. *G02B 5/0294* (2013.01); *G02B 5/09* (2013.01); *G02B 5/285* (2013.01); *G03B 21/60* (2013.01); *G03B 21/602* (2013.01); *G09G 3/003* (2013.01); *G09G 3/16* (2013.01); *H04N 9/3147* (2013.01)

(58) Field of Classification Search
CPC .... G03B 21/567; G03B 21/60; G03B 21/602; G09G 3/003; G09G 3/16; H04N 9/3147
See application file for complete search history.

(56) References Cited

U.S. PATENT DOCUMENTS

| | | |
|---|---|---|
| 5,148,309 A | 9/1992 | Yamada et al. |
| 5,193,015 A | 3/1993 | Shanks |
| 5,528,425 A | 6/1996 | Beaver |
| 5,625,489 A | 4/1997 | Glenn |
| 5,715,083 A | 2/1998 | Takayama |
| 5,964,064 A | 10/1999 | Goddard et al. |
| 6,011,580 A | 1/2000 | Hattori et al. |
| 6,144,491 A | 11/2000 | Orikasa et al. |
| 6,184,934 B1 | 2/2001 | Nishiki |
| 6,381,068 B1 | 4/2002 | Harada et al. |
| 6,924,833 B1 | 8/2005 | McDowall et al. |
| 6,988,803 B2 | 1/2006 | Maximus |
| 7,035,006 B2 | 4/2006 | Umeya et al. |
| 7,347,556 B2 | 3/2008 | Kasik et al. |
| 7,414,831 B1 | 8/2008 | Brown et al. |
| 7,471,352 B2 | 12/2008 | Woodgate et al. |
| 7,679,828 B2 | 3/2010 | Munro |
| 7,931,377 B2 | 4/2011 | Shinozaki et al. |
| 8,149,508 B2 | 4/2012 | Ferren et al. |
| 8,179,424 B2 | 5/2012 | Moller |
| 8,277,055 B2 | 10/2012 | Kuhlman et al. |
| 8,388,138 B1 | 3/2013 | Boothroyd |
| 8,567,953 B2 | 10/2013 | O'Dor et al. |
| 8,692,861 B2 | 4/2014 | Liu et al. |
| 8,714,746 B2 | 5/2014 | Choi et al. |
| 8,780,039 B2 | 7/2014 | Gay et al. |
| 8,786,683 B2 | 7/2014 | Akita |
| 2001/0030804 A1 | 10/2001 | Lambert et al. |
| 2003/0117704 A1 | 6/2003 | Lippey et al. |
| 2005/0068620 A1 | 3/2005 | Umeya |
| 2005/0231800 A1 | 10/2005 | Lippey |
| 2005/0264882 A1 | 12/2005 | Daiku |
| 2006/0056021 A1* | 3/2006 | Yeo ..................... G02B 5/0242 359/460 |
| 2006/0114171 A1 | 6/2006 | Vascotto et al. |
| 2006/0257586 A1* | 11/2006 | Umeya .................. C09K 19/02 428/1.1 |
| 2006/0268013 A1 | 11/2006 | Miles |
| 2007/0014318 A1* | 1/2007 | Hajjar .................... B82Y 10/00 372/9 |
| 2007/0127121 A1 | 6/2007 | Maximus et al. |
| 2007/0133089 A1 | 6/2007 | Lipton et al. |
| 2008/0080047 A1 | 4/2008 | Field et al. |
| 2009/0246404 A1 | 10/2009 | Greer et al. |
| 2010/0002154 A1 | 1/2010 | Hua |
| 2011/0096136 A1 | 4/2011 | Liu et al. |
| 2011/0157694 A1 | 6/2011 | Ferren et al. |
| 2012/0026157 A1 | 2/2012 | Unkel et al. |
| 2012/0320049 A1 | 12/2012 | Kim et al. |
| 2013/0181901 A1 | 7/2013 | West et al. |
| 2013/0222557 A1 | 8/2013 | Kuo et al. |
| 2013/0286154 A1 | 10/2013 | Wittke et al. |
| 2013/0300637 A1 | 11/2013 | Smits et al. |
| 2013/0308183 A1 | 11/2013 | Vermeirsch et al. |
| 2014/0016041 A1 | 1/2014 | Kim et al. |
| 2014/0016099 A1 | 1/2014 | Choi et al. |
| 2014/0375914 A1 | 12/2014 | Murao et al. |
| 2016/0088270 A1 | 3/2016 | Candry et al. |
| 2016/0088272 A1 | 3/2016 | Candry et al. |
| 2016/0116834 A1 | 4/2016 | Candry et al. |
| 2016/0202478 A1 | 7/2016 | Masson et al. |

FOREIGN PATENT DOCUMENTS

| | | |
|---|---|---|
| CN | 202939369 | 5/2013 |
| JP | 2000-338449 | 12/2000 |
| JP | 2002-365730 | 12/2002 |
| JP | 2008-175960 | 7/2008 |
| JP | 2009-198699 | 9/2009 |
| JP | 2011-128633 | 6/2011 |
| KR | 100596240 B1 | 7/2006 |
| WO | WO 91/15930 | 10/1991 |
| WO | WO 2004/010681 | 1/2004 |
| WO | WO 2008/091339 | 7/2008 |
| WO | WO 2009/040698 | 4/2009 |
| WO | WO 2011/062822 | 5/2011 |
| WO | WO 2012/040797 | 4/2012 |
| WO | WO 2012/064621 | 5/2012 |
| WO | WO 2013/063235 | 5/2013 |
| WO | WO 2013/095967 | 6/2013 |
| WO | WO 2013/182018 | 12/2013 |
| WO | WO 2015/036501 | 3/2015 |
| WO | WO 2016/014479 | 1/2016 |
| WO | WO 2016/014506 | 1/2016 |
| WO | WO 2016/014560 | 1/2016 |
| WO | WO 2016/069631 | 5/2016 |

OTHER PUBLICATIONS

Bolas et al.: "Environmental and Immersive Display Research at the University of Southern California," IEEE VR 2006 Workshop on Emerging Display Technologies, in 4 pages.

Eyevis GmbH, Immersive Cube System brochure, Feb. 2009, in 2 pages.

Eon Icube, website printout, available at http://www.eonreality.com/eon-icube/; retrieved Dec. 7, 2015 in 7 pages.

Gross et al.: "blue-c: A Spatially Immersive Display and 3D Video Portal for Telepresence," ACM Transactions on Graphics (TOG)—Proceedings of ACM SIGGRAPH 2003 TOG, vol. 22, Issue 3, Jul. 2003, ACM New York, NY, USA, pp. 819-827.

PCT International Preliminary Report on Patenatability for PCT/US15/41299 mailed Feb. 2, 2017 in 8 pages.

* cited by examiner

DISPLAY SYSTEMS AND METHODS EMPLOYING WAVELENGTH MULTIPLEXING OF COLORS

CROSS-REFERENCE TO RELATED APPLICATIONS

This application claims the benefit of priority to U.S. Prov. App'n No. 62/027,659, filed Jul. 22, 2014, entitled "Display Systems and Methods Employing Wavelength Multiplexing of Colors," which is incorporated by reference herein in its entirety.

BACKGROUND

Field

The present disclosure generally relates to projection display systems and methods having one or more projection displays arranged for immersive viewing of an image and includes systems and methods to enhance at least the dynamic range and the contrast ratio of the image based at least in part on wavelength multiplexing of the primary colors of the displays.

Description of Related Art

Digital cinema servers and projectors receive digital content for projection in a theater or other venue. The content can be packaged in one or more digital files for delivery and storage on a media server. The media server can then extract the digital content from the one or more digital files for display using one or more projectors. In some cases, the content can be 3D video projected onto a screen where slightly different visual content is projected for simultaneous observation in the right and left eyes of a viewer to create the illusion of depth. A multi-projection system can be used to display video on a plurality of screens in a venue, such as in a theater or auditorium, to facilitate an immersive experience for the viewer.

SUMMARY

Example embodiments described herein have innovative features, no single one of which is indispensable or solely responsible for their desirable attributes. Without limiting the scope of the claims, some of the advantageous features will now be summarized.

An immersive display system can include a plurality of projection systems arranged to provide immersive viewing of video. Such an immersive display system can include a plurality of projector systems that each projects video configured to complement one another to provide an immersive viewing experience for viewers. Each projector system can be configured to project its video onto a projection surface placed around an audience. In this way, the audience can experience a sense of immersion into the environment depicted in the video. Video provided by the plurality of projector systems may be projected on the plurality of projection surfaces creating a unified video presentation. Such immersive display systems are capable of generating audiovisual presentations with a relatively high level of realism due at least in part to the quality of the images provided on the plurality of projection surfaces.

However, having multiple projection surfaces can result in light being reflected from a first projection surface to a second projection surface and then to the viewer. This light mixes with the light reflected directly from the first projection surface to the viewer. Such mixing of light on the plurality of projection surfaces can reduce the contrast ratio and/or dynamic range of the projection surfaces, thereby diminishing the quality of the images provided in the immersive display system. This mixing of light can be referred to as cross-talk or cross-reflection and can be a challenge in immersive display systems. This challenge may be even more difficult to overcome for immersive display systems designed for a relatively large group of people, such as in a movie theater, due at least in part to the wide range of viewing angles of the viewers in the audience.

Accordingly, systems and methods are provided herein for immersive display systems that include a plurality of projection surfaces (e.g., screens) that are usable over a wide range of viewing angles and for which a decrease in the contrast ratio and/or dynamic range caused by cross-talk or cross-reflection between different parts of the plurality of projection surfaces is substantially reduced. In some embodiments, the systems and methods disclosed herein provide relatively high-contrast, high-dynamic range immersive viewing of images using two or more curved or plane screens where the cross-reflections are substantially suppressed by wavelength-selective absorption of the cross-reflected light.

In a first aspect, an immersive display system is provided that includes a first screen comprising a multilayer structure configured to diffusely reflect light in a first red wavelength band, a first green wavelength band, and a first blue wavelength band. The system also includes a second screen comprising a multilayer structure configured to diffusely reflect light in a second red wavelength band that does not overlap with the first red wavelength band, a second green wavelength band that does not overlap with the first green wavelength band, and a second blue wavelength band that does not overlap with the first blue wavelength band. The system also includes a third screen comprising a multilayer structure configured to diffusely reflect light in a third red wavelength band that does not overlap with the first or second red wavelength bands, a third green wavelength band that does not overlap with the first or second green wavelength bands, and a third blue wavelength band that does not overlap with the first or second blue wavelength bands. The system also includes a first projector system configured to project a first video onto the first screen, the first projector system configured to provide light within the first red wavelength band, the first green wavelength band, and the first blue wavelength band. The system also includes a second projector system configured to project a second video onto the second screen, the second projector system configured to provide light within the second red wavelength band, the second green wavelength band, and the second blue wavelength band. The system also includes a third projector system configured to project a third video onto the third screen, the third projector system configured to provide light within the third red wavelength band, the third green wavelength band, and the third blue wavelength band. The first screen and the third screen are positioned adjacent to the second screen so that the first video, the second video, and the third video are configured to be simultaneously viewed by a plurality of viewers in an immersive viewing environment.

In some embodiments of the first aspect, the first projector system is further configured to not provide light in the second or third red wavelength bands, the second or third green wavelength bands, or the second or third blue wavelength bands, the second projector system is further configured to not provide light in the first or third red wavelength bands, the first or third green wavelength bands, or the first or third blue wavelength bands, and the third projector system is further configured to not provide light in the first or second red wavelength bands, the first or second green wavelength bands, or the first or second blue wavelength bands. In some embodiments of the first aspect, the first screen is further configured to absorb light in the second and third red wavelength bands, the second and third green wavelength bands, and the second and third blue wavelength bands, the second screen is further configured to absorb light in the first and third red wavelength bands, the first and third green wavelength bands, and the first and third blue wavelength bands, and the third screen is further configured to absorb light in the first and second red wavelength hands, the first and second green wavelength bands, and the first and second blue wavelength bands. In a further embodiment, the absorption of the first screen is at least 90% in each of the second and third red wavelength bands, the second and third green wavelength bands, and the second and third blue wavelength bands. In yet another further embodiment, the absorption of the second screen is at least 90% in each of the first and third red wavelength bands, the first and third green wavelength bands, and the first and third blue wavelength bands. In yet another further embodiment, the absorption of the third screen is at least 90% in each of the first and second red wavelength bands, the first and second green wavelength bands, and the first and second blue wavelength bands.

In some embodiments of the first aspect, the absorption of the first screen is less than or equal to 5% in each of the first red wavelength band, the first green wavelength band, and the first blue wavelength band. In a further embodiment, the absorption of the second screen is less than or equal to 5% in each of the second red wavelength band, the second green wavelength band, and the second blue wavelength band. In yet another further embodiment, the absorption of the third screen is less than or equal to 5% in each of the third red wavelength band, the third green wavelength band, and the third blue wavelength band.

In some embodiments of the first aspect, the width of each of the first, second, and third red wavelength bands is less than or equal to about 10 nm. In some embodiments of the first aspect, the width of each of the first, second, and third red wavelength bands is less than or equal to about 2% of the center wavelength of the respective wavelength band.

In some embodiments of the first aspect, a center wavelength of the first red wavelength band is about 630 nm, a center wavelength of the first green wavelength band is about 540 nm, and a center wavelength of the first blue wavelength band is about 465 nm. In a further embodiment, a center wavelength of the second red wavelength band is about 620 nm, a center wavelength of the second green wavelength band is about 530 nm, and a center wavelength of the second blue wavelength band is about 455 nm. In yet another further embodiment, a center wavelength of the third red wavelength band is about 610 nm, a center wavelength of the third green wavelength band is about 520 nm, and a center wavelength of the third blue wavelength band is about 445 nm.

In some embodiments of the first aspect, the first, second, and third screens are curved.

In a second aspect, a screen for an immersive display system is provided. The screen includes a first layer comprising an anti-reflection element or a glare suppression element configured to suppress specular reflections of light incident on the screen. The screen also includes a second layer comprising a first interference coating configured to reflect light in a red wavelength band. The screen also includes a third layer comprising a second interference coating configured to reflect light in a green wavelength band. The screen also includes a fourth layer comprising a third interference coating configured to reflect light in a blue wavelength band. The screen also includes a fifth layer comprising a light-absorbing element configured to absorb visible light.

In some embodiments of the second aspect, the screen includes a reflector positioned prior to the first layer on an optical path from a projector to the screen. In a further embodiment, the reflector comprises a Fresnel reflecting surface comprising a set of flat annular sections wherein each flat surface is at a different angle.

In some embodiments of the second aspect, the screen includes a structure of micro-lenses, wherein individual micro-lenses include a light diffusing element.

In some embodiments, an immersive display system is provided that includes the screen of the second aspect. The system also includes a second screen positioned adjacent to the screen of the second aspect. The second screen includes a first layer comprising an anti-reflection element or a glare suppression element configured to suppress specular reflections of light incident on the screen; a second layer comprising a first interference coating configured to reflect light in a second red wavelength band that does not overlap with the red wavelength band; a third layer comprising a second interference coating configured to reflect light in a second green wavelength band that does not overlap with the green wavelength band; a fourth layer comprising a third interference coating configured to reflect light in a second blue wavelength band that does not overlap with the blue wavelength band; and a fifth layer comprising a light-absorbing element configured to absorb visible light.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Any feature or structure can be removed or omitted. Throughout the drawings, reference numbers can be reused to indicate correspondence between reference elements.

DETAILED DESCRIPTION

Although certain embodiments and examples are disclosed herein, inventive subject matter extends beyond the specifically disclosed embodiments to other alternative embodiments and/or uses, and to modifications and equivalents thereof. Thus, the scope of the claims appended hereto is not limited by any of the particular embodiments described below. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein.

Immersive display systems are capable of generating images with a high level of realism because the images are simultaneously presented to the viewer in many directions. Typical immersive display systems may suffer from a low contrast ratio and a low dynamic range due at least in part to cross-talk or cross-reflection. As used herein, cross-talk and/or cross-reflection refers generally to the situation where light emitted from one part of a screen of an immersive display system is incident on other parts of the screen of the immersive display system and these emitted rays are then partially reflected back to one or more viewers after diffuse reflection. This cross-talk or cross-reflection may arise in typical immersive display systems due at least in part to the screens reflecting substantially all of the light incident thereon. Generally, peripheral light, e.g., light that is not related with the local image projected on the screen or provided by the display, that is incident on a display-screen and that is not absorbed by the display-screen is superimposed on the displayed image resulting in reduced image contrast. Peripheral light or illumination can strongly deteriorate the contrast ratio of the image. Similarly, peripheral light can deteriorate the color saturation of the image and, consequently, the dynamic range of the image. Therefore, it is desirable and advantageous to reduce or minimize reflection of peripheral light in general, and in particular to reduce or minimize cross-talk.

Accordingly, disclosed herein are systems and methods to improve the rejection of peripheral light on front projection screens to thereby enhance the contrast of images generated by front projection. In particular, disclosed herein are time multiplexed screens and projector systems for use in immersive display systems, the screens and projector systems of an immersive display system being time multiplexed to reduce or minimize the effects of cross-talk on projected images.

The systems and methods provided herein are configured to improve contrast ratio and/or dynamic range for immersive display systems having a plurality of projection surfaces with a plurality of projector systems. There may be a number of systems and methods for improving contrast ratio and/or dynamic range that may be combined with the disclosed systems and methods to achieve one or more specific advantages. In some implementations, these systems and methods may have certain shortcomings that the disclosed systems and methods overcome, either on their own or in combination with other systems and methods. For example, a method to improve contrast of an immersive dome theater concentrates the brightness of the image within a central field-of-view of viewers that are unidirectionally seated in the theater. However, this may disadvantageously sacrifice brightness toward the outside edges of the viewer's field-of-view. Another method to improve contrast includes coating the screen with a visually-reflective coating that provides a textured surface and that acts as a micro-baffle to suppress cross-reflection of projected imagery. Another method to improve contrast of a curved, back-projection screen or immersive display includes using a specific tailored or optimized rear-screen coating.

The contrast of a front projection screen can be improved through the use of metal flakes and light absorbing particles distributed in a host material. Similarly, a reflection-type projection screen may include a light-reflecting layer and a transparent light-diffusing layer, the light-reflecting layer comprising a transparent resin with flakes of a light-reflective material dispersed therein and the transparent light-diffusing layer comprising a transparent resin with fine crystalline particles of calcite and achromatic dyes or pigments dispersed therein. Such screens can improve luminance and image contrast while substantially maintaining the same angle of diffusion or without substantially decreasing the angle of diffusion.

Contrast for a front-projection screen can be improved by selective reflection of light in the wavelength range of the image display light and by absorbing ambient light. For example, a screen for use in a front-projection system can include a section configured to reflect light of targeted wavelengths or targeted wavelength ranges, where the reflection is greater than non-targeted wavelengths or non-targeted wavelength ranges. Such a screen can enhance contrast between incident projected light and ambient light. As another example, a selective-reflecting projection screen can include a structure configured to selectively reflect incident optical energy of a number of relatively narrow bands of optical wavelength ranges and to absorb light with wavelengths falling between and/or outside the narrow bands. The projection screen can include a micro-lens structure that focuses incoming light so that when the light is reflected from the screen, it passes through a relatively small spot having high diffusion or beam spreading.

Rejection of ambient light can be improved in a projection screen by configuring the screen to have different reflectivities for different angles of incidence and/or polarizations. For example, ambient light rejection can be improved by configuring a screen to have relatively high reflectivity for light with a relatively low angle of incidence and a polarization parallel to that of the projector, relatively low reflectivity for light with a relatively high angle of incidence and a polarization parallel to that of the projector, and relatively low reflectivity for light with a polarization perpendicular to that of the projector (having either a low or high angle of incidence). A reflective front projection screen can be configured to project an image with enhanced contrast and relatively wide viewing angle in the presence of relatively high levels of ambient light by including a reflective polarizing element in combination with a diffusing element and/or a glare-suppression element. A projection screen can comprise a cholesteric liquid crystalline, polarized-light selective reflection layer to selectively and diffusely reflect a targeted or known polarized-light component. A front projection screen may also be overlaid with a polarized sheet.

A high contrast front projection screen can include a plurality of micro-elements that include surfaces configured to change from a low-reflectivity state to a high-reflectivity state by switching on and off appropriate structures arranged on a substrate. The surface of the micro-elements are in a low-reflectivity state for black segments of a projected image or video and are in a high-reflectivity state for segments that are outside of the black segments of the projected image or video.

A front projection screen can include a lenticular lens sheet overlaying a polarization rotation plate, the polarization plate overlaying a reflective surface, and a polarizing film overlaying the lenticular lens sheet. The polarizing film can include non-polarizing segments at the focal point of each lenticular lens so that light from the projector is relatively un-attenuated by the polarizing film while light from other sources is attenuated. Light from the projector is generally distributed with an aspect ratio of viewing angle equal to that of the lenses in the lenticular lens sheet.

A front projection screen can be overlaid with a plastic sheet filled with polymer-dispersed liquid crystals and having a transparent electrode on both sides of the plastic sheet. The plastic sheet is transparent in a first state and can be turned to white by applying a voltage across the plastic sheet. The plastic sheet can be coated black on a one side so that when no voltage is applied to the electrodes, the screen is black due at least in part to reflected light from the back side of the transparent plastic sheet. When voltage is applied to the electrodes, the screen can turn white during the time that the voltage is applied. The screen can receive pulses of voltage that are synchronized with a pulsing of a projector. In such a scenario, the screen can be configured to be white or to have a relatively high reflectivity during the time that the projector is active, and to be black or to have a relatively low reflectivity when the projector is inactive.

Some screens can have a visually-reflective layer applied to an inner surface of an open-cell foam. The reflective coating can be applied sufficiently thin to not fill and/or block the open-cell foam structure. The reflective coating can coat the inside of the open cells. This can yield a projection surface that reflects most light at near-normal incidence angles, and trap in the open cell light from more oblique incident angels, thereby reducing cross-reflections. The resulting screen includes a micro-baffled screen surface with a relatively high degree of directionality and with a relatively rapid angular cut-off. However, this design may be undesirable and/or disadvantageous in an immersive display system where a wide range of viewing angles with the same or almost the same luminance is desired or preferable. This may also be undesirable and/or disadvantageous in an immersive display system where a smooth and gradual decrease in luminance as a function of viewing angle is desired or preferable.

The above systems and methods can be used to enhance the contrast of immersive display systems by reducing cross-reflection, but may suffer from some disadvantages that are overcome by the systems and methods described herein. In particular, some embodiments disclosed herein provide for an immersive display system that suppresses cross-reflection and that has a targeted or desired luminance as a function of viewing angle (e.g., a smooth and gradual decrease in luminance as a function of viewing angle).

Some of the above-described screen designs assume that viewers use the same or similar central field-of-view. This may be disadvantageous because it restricts the use of the immersive display system. Some of the above-described issues may be addressed by the systems and methods disclosed herein. In particular, an immersive display system is described that suppresses cross-reflection while providing a substantial improvement to contrast where viewing directions are allowed to expand beyond a common central field-of-view. Such an immersive display system can be used in more situations and configurations because it provides an improved viewing experience for a larger audience.

Some of the above-described systems and methods configured to enhance contrast for front-projection systems are aimed at rejecting ambient light for use with individual front projectors. Such systems and methods may not be effective for suppressing cross-reflection and improving contrast for ensembles of projectors configured to project images on multiple front and/or rear projection screens. In such immersive display systems with multiple projectors and/or screens, the relative screen orientations and optical screen characteristics may produce cross-reflections which reduce contrast and/or color saturation of projected images. Accordingly, one or more of the embodiments disclosed herein include an immersive display system that effectively suppresses cross-reflection.

Immersive Display System

Figure 1A:
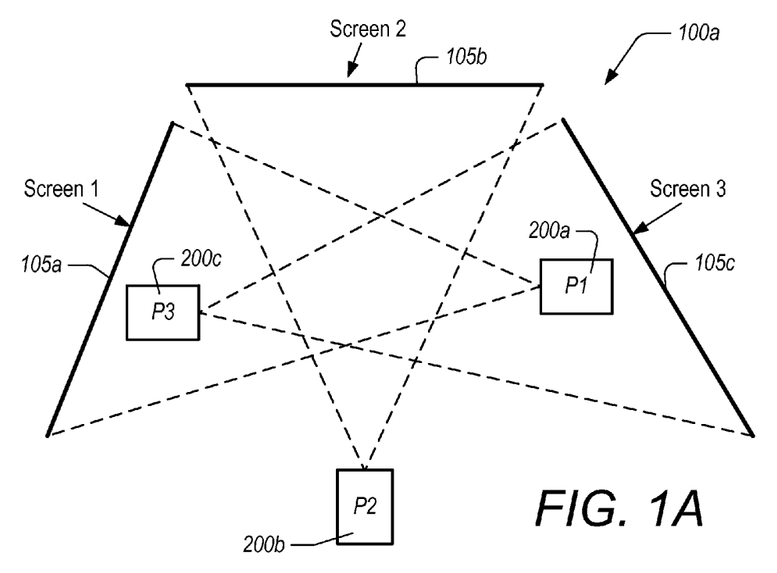
FIGS. 1A and 1B illustrate example immersive display systems for providing an immersive display experience.
Figure 1B:
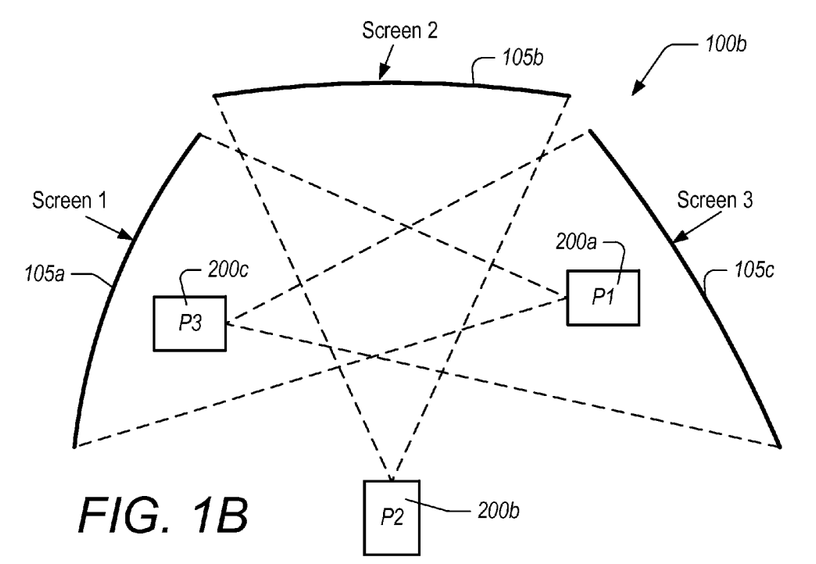

FIGS. 1A and 1B illustrate example immersive display systems 100a, 100b comprising a plurality of projectors 200a, 200b, 200c configured to project images onto corresponding screens 105a, 105b, 105c for providing an immersive display experience. The screens 105a-105c can be planar front-projection displays, as illustrated in FIG. 1A, or curved front-projection displays, as illustrated in FIG. 1B. There can be gaps between adjacent displays. For example, screens 105a-c can have gaps between them as depicted in FIGS. 1A and 1B. In some embodiments, the gaps can be relatively small, close to zero, or zero. The immersive display systems 100a, 100b can include a plurality of flat or curved displays or screens or it can include a single curved display or screen. The screens can be rotated relative to one another. The screens 105a-c can also have respective inclinations relative to one another. The screens 105a-c of the immersive display systems 100a, 100b can include flat screens, curved screens, or a combination of both.

The example immersive display systems 100a, 100b includes three front-projection screens 105a-c wherein the image on each screen is provided by a projector system. Projector system 200a is configured to project video onto screen 105a, projector system 200b is configured to project video onto screen 105b, and projector system 200c is configured to project video onto screen 105c. Sound systems may be mounted behind screen 105a, screen 105b and/or screen 105c. The light emitted by the projector systems P1, P2 and P3 can have desired or selected polarization states or can be randomly polarized.

In some embodiments, the screens 105a-c can be curved screens, an example of which is illustrated in FIG. 1B. The considered curvature can be in the plane of the paper, in a plane perpendicular to the plane of the paper, or in both the plane of the paper and in a plane perpendicular to the paper. This immersive display system 100b, for example, comprises three curved front-projection screens 105a-c, and the image on each screen is projected from one or more projectors. For example, projector system P1 200a can be one or more projectors projecting the image on screen 1 105a, projector system P2 200b can be one or more projectors projecting the image on screen 2 105b, and projector system P3 200c can be one or more projectors projecting the image on screen 3 105c.

Light emerging from the projector systems 200a-c can each have different spectra. This may result in color differences between the images provided by these projector systems. These color differences can be electronically compensated. An example method for compensating color differences between two projectors is disclosed in U.S. Pat. Pub. No. 2007/0127121 to B. Maximus et al., which is incorporated by reference herein in its entirety. The spectra of the projector systems 200a-c can be configured to project, after electronic compensation, color images with a color gamut according to Rec. 709 or DCI P3, for example.

The projector systems 200a-c refer to devices configured to project video on the screens 150a-c. These projector systems 200a-c can include a media server and a projector.

In some embodiments, the media server is physically separate from the projector and is communicably coupled (e.g., through wired or wireless connections) to the projector. In some embodiments, the projector system comprises an integrated media server and projector. The media server portion of the projector system can include hardware and software components configured to receive, store, and decode media content. The media server can include hardware and software configured to ingest and decode digital content files, to produce a media stream (e.g., video and audio), to send image data to the projector. The media server can include modules for ingesting digital content, decoding ingested content, generating video from the decoded content, generating audio from the decoded content, providing security credentials to access secure content, and to generate or interpret synchronization signals to provide a synchronized presentation, and the like. The projector can include an optical engine, a modulation element, optics, and the like to enable the projector to produce, modulate, and project an image. For example, the projector may be implemented using a cathode ray tube (CRT), a liquid crystal display (LCD), digital light processing (DLP), digital micro-mirror devices (DMD), etc.

The projector systems 200a-c can be configured to provide video with an aspect ratio and resolution conforming to any of a number of standards including, for example and without limitation, 4K (e.g., 3636×2664, 3996×2160, 3840× 2160, 4096×2160, etc.), 2K (e.g., 1828×1332, 1998×1080), HD (e.g., 1920×1080, 1280×720), or the like. The projector systems 200a-c can be configured to provide video with a variety of frame rates including, for example and without limitation, 24 fps, 30 fps, 60 fps, 120 fps, etc. The projector systems 200a-c can be configured to display synchronized 3D content (e.g., stereoscopic video) on two or more screens.

As an example, the immersive display systems 100a, 100b can include DCI-compliant projector systems 200a-c configured to play DCI-compliant content inside a movie theater. The DCI-compliant content can include a media stream (e.g., video data or video and audio data extracted from digital content). In some implementations, the media stream is provided as a digital cinema package ("DCP") comprising compressed, encrypted, and packaged data for distribution to movie theaters, for example. The data can include a digital cinema distribution master ("DCDM") comprising the image structure, audio structure, subtitle structure, and the like mapped to data file formats. The data can include picture essence files and audio essence files that make up the audiovisual presentation in the DCP. The DCP can include a composition which includes all of the essence and metadata required for a single digital presentation of a feature, trailer, advertisement, logo, or the like. The projector systems 200a-c can be configured to ingest the DCP and generate a visually indistinguishable copy of the DCDM and then use that copy of the DCDM to generate image and sound for presentation to an audience.

FIGS. 1A and 1B illustrate three projector systems 200a-c and three screens 105a-c. However, the immersive display system can include a different number of projector systems and/or screens. For example, the immersive display systems 100a, 100b can include 2, 3, 4, 5, 6, 7, 8, 9, 10, or more than 10 projector systems. The immersive display systems 100a, 100b can include 2, 3, 4, 5, 6, 7, 8, 9, 10, or more than 10 screens. The immersive display systems 100a, 100b can be configured such that more than one projector system provides video on a single screen, such that the images substantially overlap. The immersive display systems 100a, 100b can be configured such that projector systems provide video on a single screen wherein the videos from projector systems minimally overlap, are adjacent to one another, or are near one another to provide a substantially unitary video presentation.

The sound in an immersive display system can be important, and may be of comparable importance to the visual information. Typical immersive display systems may experience problems with audio or acoustics based at least in part on the viewing surface acting as an acoustic reflector. This can result in undesirable and/or unwanted echoes and reverberations of sounds within the immersive environment. In some implementations, the immersive display systems 100a, 100b include perforated display screens 105a, 105b, and/or 105c to reduce this problem. Perforated display screens can be configured to allow sound within the immersive environment to escape the environment and to allow sound from speakers behind the screens to enter the immersive environment. This can reduce or eliminate unwanted or undesirable echoes and reverberations while increasing the desired sound within the immersive environment.

Sound systems may be mounted behind the front projection screen 1 105a, screen 2 105b and/or screen 3 105c. To reduce attenuation of high frequency sound waves, arrays of perforations (e.g. circular holes) may be used. The perforation in a screen may be laid out so that the centers of the holes are equidistant in, for example and without limitation, a staggered or straight hole arrangement. The number of equidistant circular holes per unit area, the hole diameter, and/or the screen thickness are parameters that can be tuned to achieve acceptable or suitable transmission loss at frequencies larger than about 1 kHz.

Example Immersive Display System Screens

Figure 2A:
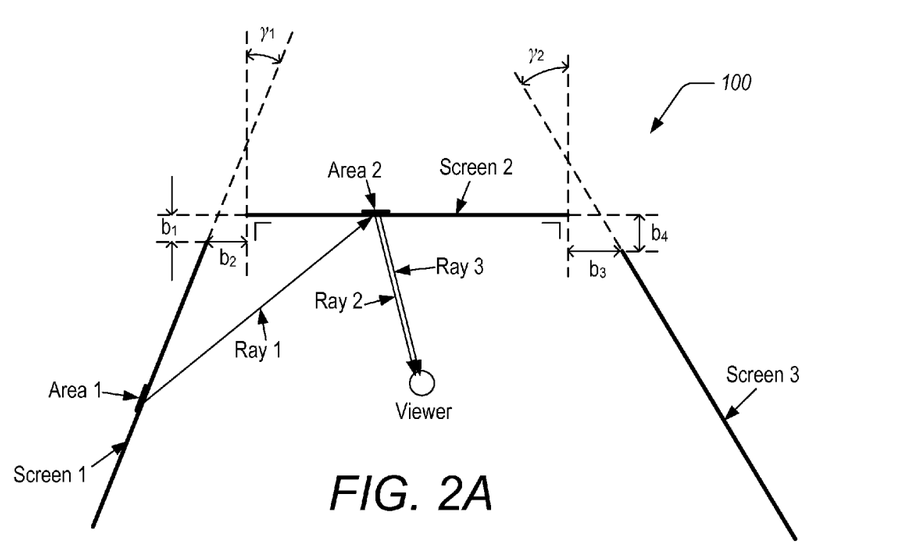
FIGS. 2A and 2B illustrate examples of immersive display systems comprising three screens, and illustrate examples of cross-talk in such immersive display systems.
Figure 2B:
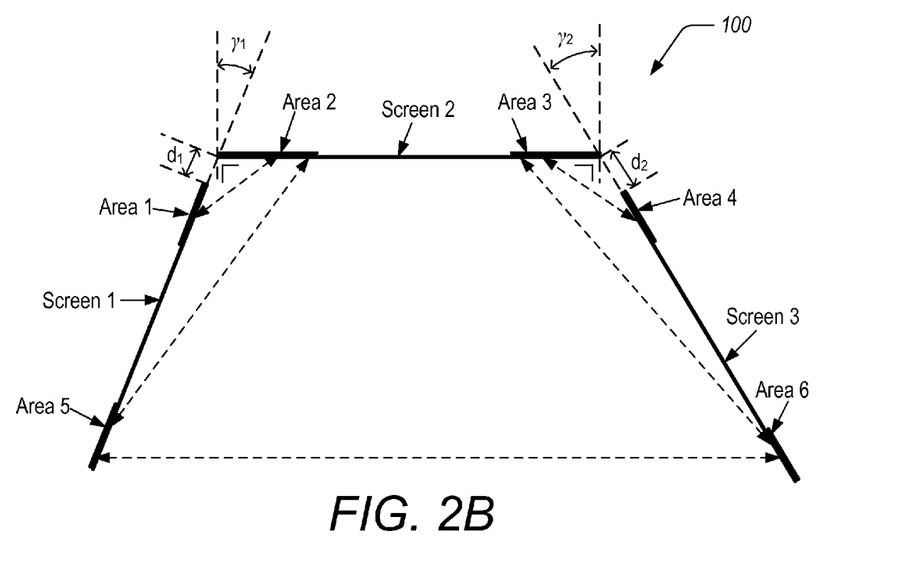

FIGS. 2A and 2B illustrate examples of immersive display systems 100 comprising three screens, and illustrate examples of cross-talk in such immersive display systems. An immersive display system 100 can include a plurality of screens. The screens can be arranged such that there are gaps between adjacent displays. For example, the immersive display system 100 illustrated in FIG. 2A can have gaps $b_1$, $b_2$, $b_3$, and $b_4$, and the immersive display system 100 illustrated in FIG. 2B can have gaps $d_1$ and $d_2$. In some embodiments, the gaps can be relatively small, close to zero, or zero. The screens can have a relative orientation characterized, for example, by angles $\gamma_1$ and $\gamma_2$. Screens 1, 2 and 3 can also have respective inclinations corresponding to angles $\gamma_3$, $\gamma_4$, and $\gamma_5$, where the angles are measured with respect to a direction perpendicular to the plane of the paper.

With reference to FIG. 2A, Ray 1 represents reflected light from an image projected onto Screen 1, Ray 1 reflected from Area 1 and incident on Area 2 of Screen 2. Ray 3 represents reflected light from an image projected onto Screen 2 at Area 2 that reaches a viewer. Ray 2 represents reflected light from Ray 1 at Area 2 on Screen 2. In the absence of Ray 1, Ray 3 is reflected by Screen 2 to the viewer, Ray 3 being part of the original image. Where there is cross-talk from Area 1 onto Area 2, however, Ray 2 is also perceived by the viewer. The mixture of Ray 2 and Ray 3 is referred to as cross-talk and can substantially reduce the contrast ratio and the color saturation of the original images, consequently reducing the dynamic range of the original images.

FIG. 2B illustrates another example of cross-talk, where intensity can depend on a distance between areas that are mutually illuminated. For example, the immersive display system 100 includes multiple adjacent or almost adjacent screens, the cross-talk may be pronounced on the parts of the screens that can illuminate each other from a relatively short distance and for screen-configurations where the angle between the screens is relatively small. As the distance between the considered screen areas increases, the illuminance caused by the cross-talk decreases (e.g., approximated by an inverse square law), and when the angle between the screens increases the illuminance also decreases (e.g., approximated by the cosine law of illumination). For example, for the immersive display system 100, the cross-talk between Area 1 and Area 2 or between Area 3 and Area 4 will be more intense than between Area 2 and Area 5, between Area 3 and Area 6, or between Area 5 and Area 6.

To illustrate the effect of cross-talk on contrast ratio, a simple example will be provided. Contrast ratio is related to the quality of a display system. The full-on/full-off contrast ratio (e.g., sequential contrast ratio) can be defined as a ratio of maximum luminance to minimum luminance. Maximum luminance, $L_{max}$, can be a luminance value output by a display that is driven with a 100% white signal, and minimum luminance, $L_{min}$, can be a luminance value output by a display that is driven with a 0% white level (e.g., a black level).

$$C_{onoff} = \frac{L_{max}}{L_{min}}$$

The measured luminance in general depends on the observation angle and the contrast ratio is generally a function of the observation angle. Where there is peripheral illumination incident on the screen of the display, it may be partially reflected towards the viewer and added to the luminance from the display. With a non-zero peripheral illumination, the full-on/full-off contrast ratio is:

$$C_{onoff} = \frac{L_{max} + L_a}{L_{min} + L_a}$$

where $L_a$ corresponds to the peripheral illumination and the reflection characteristics of the display screen.

Another method to characterize the contrast ratio of a display is sometimes referred to as the 'checkerboard method,' and is prescribed in ANSI 1992, IEC 2002. In this method, a 4×4 checkerboard pattern of black and white rectangles that covers the complete image area of the display is used. The luminance at the center of each rectangle is measured. The eight white values are averaged, $\langle L_{cb,max} \rangle$, and the eight black values are averaged, $\langle L_{cb,min} \rangle$. The contrast, sometimes referred to as ANSI contrast ratio, is then:

$$C_{ANSI} = \frac{\langle L_{cb,max} \rangle}{\langle L_{cb,min} \rangle}$$

The ANSI contrast ratio can generally depend on the observation angle; and, if the peripheral illumination is non-zero, that non-zero illumination may also influence the measured ANSI contrast ratio:

$$C_{ANSI} = \frac{\langle L_{cb,max} \rangle + L_a}{\langle L_{cb,min} \rangle + L_a}$$

Values for projection displays are provided to give some example values for contrast ratios (e.g., $C_{onoff}$ and $C_{ANSI}$). As demonstrated by these values, the contrast ratio can greatly reduce where there is peripheral illumination. A first example projection display has a maximum luminance, measured in a direction orthogonal to the screen, of 500 cd/m$^2$ and a minimum luminance of 0.25 cd/m$^2$, giving a full-on/full-off contrast ratio of 2000:1 when the peripheral light is zero. If, instead, there is incident peripheral light that is reflected to the observer and that reflected peripheral light adds 5 cd/m$^2$, then the full-on/full-off contrast ratio is reduced to ~96:1. For a typical projection display, the ANSI contrast ratio is lower than the full-on/full-off contrast ratio and can be, for example, ~200:1. For the same reflection of the peripheral light described in this paragraph, the ANSI contrast ratio is reduced to ~67:1.

Example Wavelength Multiplexed Screens

With reference to FIG. 1A, light provided by projector system P1 200*a* on screen 1 105*a* can be configured to have a spectral composition that is strongly diffuse-reflected by screen 1. Similarly, light provided by projector system P2 200*b* on screen 2 105*b* can be configured to have a spectral composition that is strongly diffuse-reflected by screen 2. Likewise, light provided by projector system P3 200*c* on screen 3 105*c* can be configured to have a spectral composition that is strongly diffuse-reflected by screen 3.

Cross-reflected light from screen 1 on screen 2 and screen 3 can be configured to have a spectral composition that is strongly absorbed by screen 2 and screen 3. Similarly, cross-reflected light from screen 2 on screen 1 and screen 3 can be configured to have a spectral composition that is strongly absorbed by screen 1 and screen 3. Likewise, cross-reflected light from screen 3 on screen 1 and screen 2 can be configured to have a spectral composition that is strongly absorbed by screen 1 and screen 2.

Light emerging from projector system P1, for example, can be configured to have a spectral power density that is concentrated in three or more non-overlapping wavelength regions centered around wavelengths $\lambda_{r1}$, $\lambda_{g1}$, and $\lambda_{b1}$ with respective spectral widths $\Delta\lambda_{r1}$, $\Delta\lambda_{g1}$, and $\Delta\lambda_{b1}$. Similarly, light emerging from projector system P2, for example, can be configured to have a spectral power density that is concentrated in three or more non-overlapping wavelength regions centered around wavelengths $\lambda_{r2}$, $\lambda_{g2}$, and $\lambda_{b2}$ with respective spectral widths $\Delta\lambda_{r2}$, $\Delta\lambda_{g2}$, and $\Delta\lambda_{b2}$. Likewise, light emerging from projector system P3, for example, can be configured to have a spectral power density that is concentrated in three or more non-overlapping wavelength regions centered around wavelengths $\lambda_{r3}$, $\lambda_{g3}$, and $\lambda_{b3}$ with respective spectral widths $\Delta\lambda_{r3}$, $\Delta\lambda_{g3}$, and $\Delta\lambda_{b3}$. In some embodiments, the spectral power densities of projector systems P1, P2, and/or P3 can be mutually non-overlapping.

For display colorimetric reasons, the wavelengths $\lambda_{r1}$, $\lambda_{r2}$, and $\lambda_{r3}$ can be located in a relatively small wavelength region, for example 610 nm≤λ≤630 nm. Similarly, the wavelengths $\lambda_{g1}$, $\lambda_{g2}$, and $\lambda_{g3}$ can be located in a relatively small wavelength region, for example 520 nm≤λ≤540 nm, and the wavelengths $\lambda_{b1}$, $\lambda_{b2}$, and $\lambda_{b3}$ can be located in a relatively small wavelength region, for example 445 nm≤λ≤465 nm.

Light emerging from the projector systems P1, P2, and/or P3 can have different spectra. This may result in color differences between the images provided by these projectors. These color differences can be electronically compensated. An example method for compensating color differences between two projectors is disclosed in U.S. Pat. Pub. No. 2007/0127121 to B. Maximus et al., which is incorporated by reference herein in its entirety. The spectra of the projector systems P1, P2, and/or P3 can be configured to project, after electronic compensation, color images with a color gamut according to Rec. 709 or DCI P3, for example.

Figure 3:
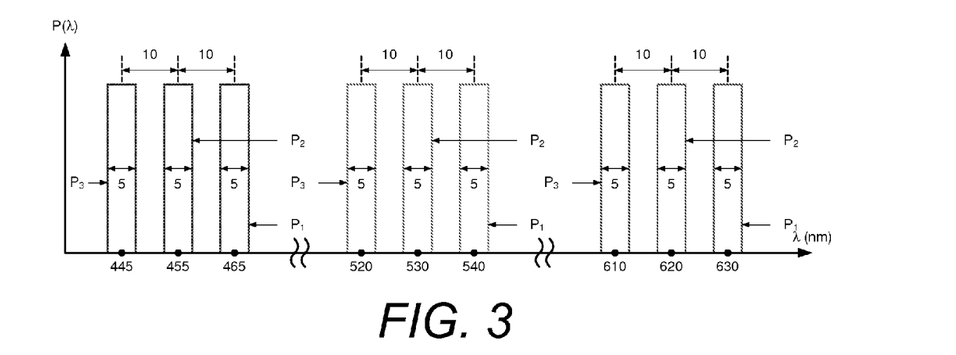
FIG. 3 illustrates some example spectral power density distributions output by respective projector systems.

FIG. 3 illustrates some example spectral power density distributions. The example spectral power density distribution for a particular projector system can have a width of at least about 5 nm or less than or equal to about 5 nm per color output band. The center wavelengths in a particular color output band for respective projectors can be separated by at least about 10 nm or less than or equal to about 10 nm.

Light emerging from projector system P1 can be centered around the wavelengths $\lambda_{r1}$=630 nm, $\lambda_{g1}$=540 nm, and $\lambda_{b1}$=465 nm with respective spectral widths $\Delta\lambda_{r1}$=5 nm, $\Delta\lambda_{g1}$=5 nm, and $\Delta\lambda_{b1}$=5 nm. Similarly, light emerging from projector system P2 can be centered around the wavelengths $\lambda_{r2}$=620 nm, $\lambda_{g2}$=530 nm, and $\lambda_{b2}$=455 nm with respective spectral widths $\Delta\lambda_{r2}$=5 nm, $\Delta\lambda_{g2}$=5 nm, and $\Delta\lambda_{b2}$=5 nm. Likewise, light emerging from projector system P3 can be centered around the wavelengths $\lambda_{r3}$=610 nm, $\lambda_{g3}$=520 nm, and $\lambda_{b3}$=445 nm with respective spectral widths $\Delta\lambda_{r3}$=5 nm, $\Delta\lambda_{g3}$=5 nm, and $\Delta\lambda_{b3}$=5 nm.

Such narrow-band spectra can be realized with projector systems that use, for example and without limitation, red, green and/or blue semiconductor diode lasers or other solid state laser technologies such as diode pumped solid state lasers (DPSS) with second harmonic generation (SHG), or VECSEL (vertical-cavity surface-emitting lasers) with frequency doubling. The red semiconductors laser diodes can be typically AlGaInP/GaAs laser diode bars, and multi-mode InGaN/GaN laser diode technology can be used for the blue and the green semiconductor laser diodes.

Figure 4:
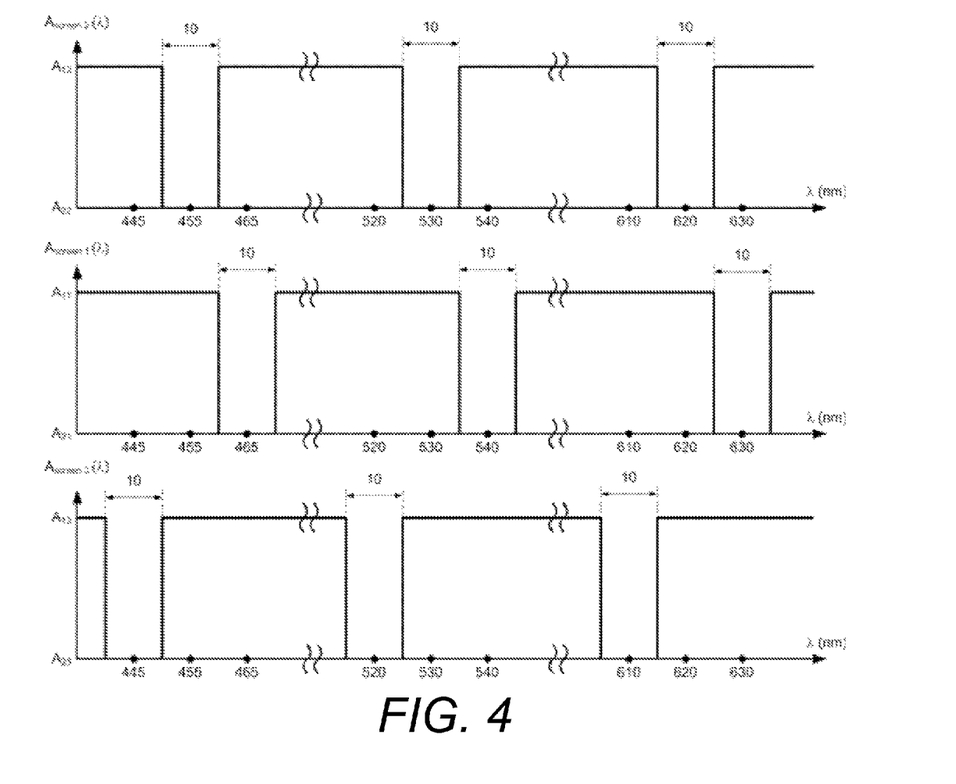
FIG. 4 illustrates some example absorption spectra for screens in an immersive display system.

FIG. 4 illustrates some example absorption spectra for screens in an immersive display system. Screen 1 can be a diffuse reflective wavelength selective screen in the wavelength ranges $\lambda_{r1}\pm\Delta\lambda_{sr1}$, $\lambda_{g1}\pm\Delta\lambda_{sg1}$, $\lambda_{b1}\pm\Delta\lambda_{sb1}$. The central wavelengths of the reflective wavelength bands can be approximately equal to the central wavelengths of the wavelength bands of the light emerging from projector system P1. The widths of the wavelength ranges for reflection by screen 1 can be chosen to have a relatively high reflectivity for light emitted by the projector system P1 and to have a relatively low reflectivity for light emitted by the projector systems P2 and/or P3. Light that is not reflected by screen 1 can be absorbed and/or transmitted by screen 1.

Similarly, screen 2 can be a diffuse reflective wavelength selective screen in the wavelength ranges $\lambda_{r2}\pm\Delta\lambda_{sr2}$, $\lambda_{g2}\pm\Delta\lambda_{sg2}$, $\lambda_{b2}\pm\Delta\lambda_{sb2}$. The central wavelengths of the reflective wavelength bands can be approximately equal to the central wavelengths of the wavelength bands of the light emerging from projector system P2. The widths of the wavelength ranges for reflection by screen 2 can be chosen to have a relatively high reflectivity for light emitted by the projector system P2 and to have a relatively low reflectivity for light emitted by the projector systems P1 and/or P3. Light that is not reflected by screen 2 can be absorbed and/or transmitted by screen 2.

Likewise, screen 3 can be a diffuse reflective wavelength selective screen in the wavelength ranges $\lambda_{r3}\pm\Delta\lambda_{sr3}$, $\lambda_{g3}\pm\Delta\lambda_{sg3}$, $\lambda_{b3}\pm\Delta\lambda_{sb3}$. The central wavelengths of the reflective wavelength bands can be approximately equal to the central wavelengths of the wavelength bands of the light emerging from projector system P3. The widths of the wavelength ranges for reflection by screen 3 can be chosen to have a relatively high reflectivity for light emitted by the projector system P3 and to have a relatively low reflectivity for light emitted by the projector systems P1 and/or P2. Light that is not reflected by screen 3 can be absorbed and/or transmitted by screen 3.

Examples of wavelength selective diffuse reflecting screens with projector systems emitting light in matched wavelength ranges are provided below. The incident light from projector system P1 on screen 1 can have a spectral power distribution in the wavelength ranges 465 nm±2.5 nm (e.g., blue light), 540 nm±2.5 nm (e.g., green light) and 630 nm±2.5 nm (e.g., red light). Projector system P1 projects images onto screen 1, and screen 1 can strongly and diffusely reflect light in these wavelength ranges and can weakly absorb the light in these wavelength ranges. For example, the absorption of screen 1 in these wavelength ranges, $A_{21}$, can be less than or equal to about 5%.

The cross-reflected light from screen 2 and/or screen 3 can be in the wavelength ranges 455 nm±2.5 nm, 530 nm±2.5 nm and 620 nm±2.5 nm (e.g., from screen 2) and in the wavelength ranges 445 nm±2.5 nm, 520 nm±2.5 nm and 610 nm±2.5 nm (e.g., from screen 3). This cross-reflected light can be strongly absorbed by screen 1. For example, the absorption of screen 1 in these wavelength ranges, $A_{11}$, can be greater than or equal to about 90%.

The incident light from projector system P2 on screen 2 can have a spectral power distribution in the wavelength ranges 455 nm±2.5 nm (e.g., blue light), 530 nm±2.5 nm (e.g., green light) and 620 nm±2.5 nm (e.g., red light). Projector system P2 projects images on screen 2, and screen 2 can strongly and diffusely reflect light in these wavelength ranges and can weakly absorb the light in these wavelength ranges. For example, the absorption of screen 2 in these wavelength ranges, $A_{22}$, can be less than or equal to about 5%.

The cross-reflected light from screen 1 and/or screen 3 can be in the wavelength ranges 465 nm±2.5 nm, 540 nm±2.5 nm and 630 nm±2.5 nm (e.g., from screen 1) and in the wavelength ranges 445 nm±2.5 nm, 520 nm±2.5 nm and 610 nm±2.5 nm (e.g., from screen 3). This cross-reflected light can be strongly absorbed by screen 2. For example, the absorption of screen 2 in these wavelength ranges, $A_{12}$, can be greater than or equal to about 90%.

The incident light from projector system P3 on screen 3 can have a spectral power distribution in the wavelength ranges 445 nm±2.5 nm (e.g., blue light), 520 nm±2.5 nm (e.g., green light) and 610 nm±2.5 nm (e.g., red light). Projector system P3 projects images on screen 3, and screen 3 can strongly and diffusely reflect light in these wavelength ranges and can weakly absorb the light in these wavelength ranges. For example, the absorption of screen 3 in these wavelength ranges, $A_{23}$, can be less than or equal to about 5%.

The cross-reflected light from screen 1 and/or screen 2 can be in the wavelength ranges 465 nm±2.5 nm, 540 nm±2.5 nm and 630 nm±2.5 nm (e.g., from screen 1) and in the wavelength ranges 455 nm±2.5 nm, 530 nm±2.5 nm and 620 nm±2.5 nm (e.g., from screen 2). This cross-reflected light can be strongly absorbed by screen 3. For example, the absorption of screen 3 in these wavelength ranges, $A_{13}$, can be greater than or equal to about 90%.

The wavelength selective reflection in narrow wavelength bands for each of the front projection screens can be realized with, for example and without limitation, multi-layer interference coatings for the red, green and blue wavelength bands that are attached to a light-absorbing substrate in the visible wavelength range. An example method for providing narrow wavelength bands of less than 6% of the center wavelength is disclosed in U.S. Pat. Pub. No. 2003/0117704 to B. Lippey et al, which is incorporated by reference herein in its entirety. In the above example the wavelength bands with high reflectivity can have a width of approximately 2% of the central wavelength.

Example Screens with Multi-Layer Structure

Figure 5:
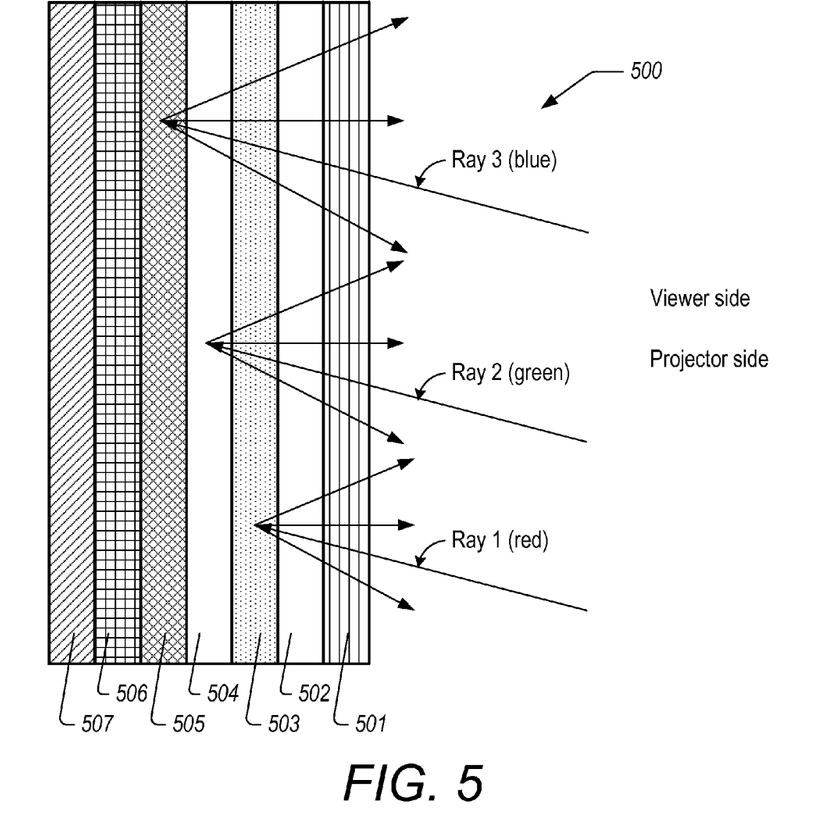
FIG. 5 illustrates an example of a wavelength selective screen comprising multiple layers.

FIG. 5 illustrates an example of a wavelength selective screen 500 having a multi-layer structure, wherein the screen 500 is configured to strongly diffusely reflect light in relatively narrow wavelength bands in the red, green, and blue portions of the visible spectrum. The screen 500 can be, for example, a front-projection screen. The screen 500 includes multiple layers including an anti-reflection coating or glare-suppression element 501, multi-layer interference coatings for the reflection of light in a narrow wavelength band in the red 502, green 503 and blue 504 wavelength regions, an absorption element in the visible wavelength range 505, and a supporting substrate 506. The screen 500 may also include an optional adhesive layer 507. The screen can strongly diffusely reflect, for example, red light in a narrow wavelength band (Ray 1) at the layer 503, green light in a narrow wavelength band (Ray 2) at the layer 504, and blue light in a narrow wavelength band (Ray 3) at the layer 505.

To obtain a relatively high value of the reflectivity with a multi-layer interference filter, for example, a stack of alternate layers, H, of high refractive index material, $n_H$, and layers, L, of low refractive index materials, $n_L$, materials can be used. The thickness of each layer can be about ¼ of the central wavelength in the material. Dielectric materials can be used for the alternate layers H and L. Examples of dielectric material with a high refractive index include $TiO_2$ (n=2.61) and $Ta_2O_5$ (n=1.80). Examples of dielectric material with a low refractive index include $SiO_2$ (n=1.54). The wavelength width of the high reflectivity zone depends at least in part on the number of alternate layers H and L, the refractive index $n_L$, and the refractive index $n_H$. For example, increasing the number of alternate layers with the same H and L materials results in a smaller wavelength width. As another example, smaller differences between $n_H$ and $n_L$ result in a smaller wavelength width for the same number of layers.

The reflection curves of multi-layer interference filters change with the angle of incidence and typically exhibit a shift to shorter wavelengths. For example, this shift can be about 1.9 nm per degree for small angle deviations from normal incidence. To reduce this shift to shorter wavelengths with increasing angle of incidence, the multi-layer interference filter can be made non-uniform so that at each position on the screen the coating can be tailored according to the non-normal light incidence at that particular position.

Figure 6:
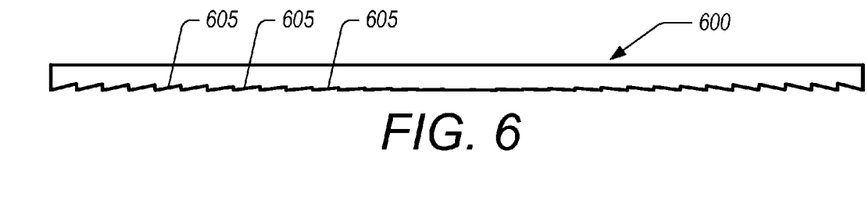
FIG. 6 illustrates a cross-section view of a reflector for use with a wavelength selective screen, the reflector having a set of flat annular sections with each flat surface at a different angle from 0° to ±15° in steps of about 1°.

In some embodiments, the screen 500 can be curved so that the incident angle keeps almost normal on each position of the screen 500. For example, this can be realized by replacing the curved reflecting surface with a Fresnel reflecting surface, such as a set of flat annular sections with each flat surface at a different angle, an example of which is illustrated in FIG. 6. FIG. 6 illustrates a cross-section view of a reflector 600 with a set of flat annular sections 605 with each flat surface at a different angle from 0° to ±15° in steps of about 1°. The maximum incident angle on the screen depends at least in part on the throw ratio of the projector, or the ratio of the projection distance B to the screen width A.

The front projection screen can diffusely reflect incident light from its associated projector in the directions of the viewing locations. This can generally be a relatively wide range of angles. However, the multi-layer interference coating may have a relatively strong specular reflection in the narrow wavelength bands of the light of its associated projector. In some embodiments, a diffusor or light scatter element can be added to the screen. In certain implementations, the diffusor or light scatter element can be configured to not significantly influence or change the incident angle of the light rays on the multi-layer interference coating. This can be advantageous where the narrow wavelength reflection band of the multi-layer interference coating shifts to shorter wavelengths with increasing incident angle because this can cause absorption of the incident light instead of a strong reflection. In some embodiments, the screen does not include bulk diffusers in a layer on top of the multi-layer interference coating or a surface scatter element on top of the multi-layer interference coating.

Figure 7A:
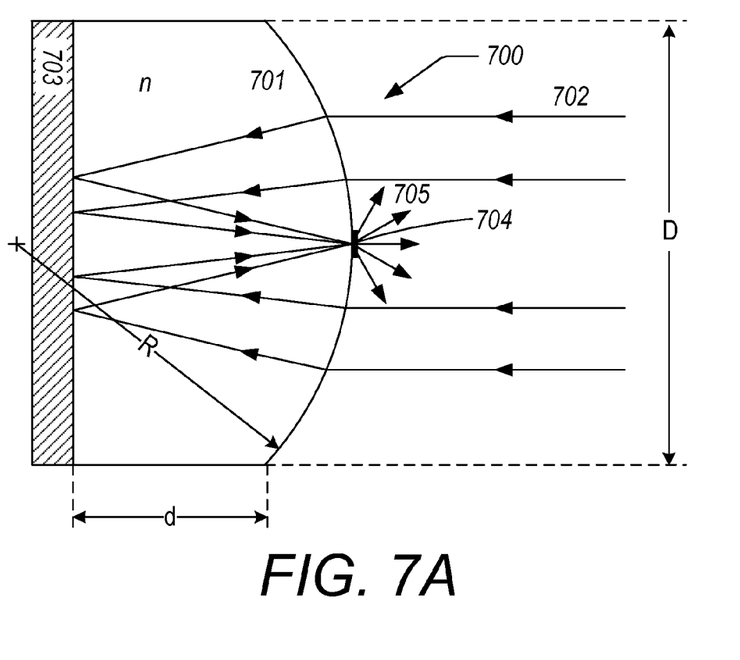
FIGS. 7A and 7B illustrate examples of micro-lenses with light diffusing elements.
Figure 7B:
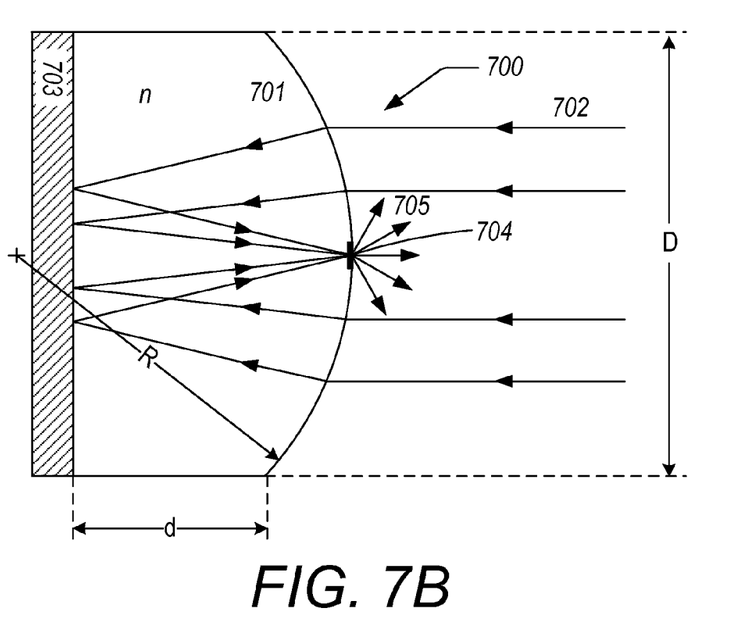

In some embodiments, a screen can include a structure of micro-lenses with a small light diffusing element on top of each micro-lens. FIGS. 7A and 7B illustrate examples of micro-lenses 700 with light diffusing elements 704. For example, each micro-lens 700 can receive an almost collimated bundle of light rays 702 substantially parallel with the optical axis of the micro-lens. This may occur when the structure of micro-lenses is applied in combination with a set of flat annular sections with each flat surface at a different angle, such as the reflector 600 described herein with reference to FIG. 6. The micro-lenses 700 can be configured to slightly converge the light rays 701 towards the multi-layer interference coating 703. The converging angle can be small to avoid undesirable shift of the reflection band. The small converging angle can be realized with a choice of curvature R and diameter D of the micro-lenses 700, and the refractive index n of the micro-lens material. For example, micro-lens material PMMA (polymethyl methacrylate) has a refractive index of approximately 1.491. The structure can be dimensioned to have the converged and reflected incoming light from the micro-lens going through a small spot 704 on top of each micro-lens, as illustrated in FIG. 7A, or inside the micro-lens body at or near the focal location, as illustrated in FIG. 7B. The light reaching the light diffusing element 704 can then undergo a strong diffusion or scattering 705 by the light diffusing element 704 located on this small spot. This light diffusing element 704 can be, for example, a small bulk diffuser or a small surface diffuser. In some embodiments, this light diffusing element 704 can have an anti-symmetric scattering profile. For example, the scattering profile can have a different light scatting profile in the horizontal direction than in the vertical direction.

As illustrated in FIGS. 7A and 7B, the micro-lens 700 has a radius R, a diameter D and a refractive index n. The micro-lens 700 can be positioned on the front side of a reflective screen, for example. In use, incident light rays 702 are slightly converged towards the reflective multi-layer interference coating 703 and the light energy in the narrow wavelength bands are reflected back by the multi-layer interference coating 703 and focused on the diffusing element 704, which scatters light rays in the directions of the viewing locations 705.

Conclusion

The various features described above may be used independently of one another, or may be combined in various ways. All possible combinations and sub-combinations are intended to fall within the scope of this disclosure. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, is not generally intended to imply that features, elements and/or steps are required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present. The terms "about" or "approximate" and the like are synonymous and are used to indicate that the value modified by the term has an understood range associated with it, where the range can be ±20%, =15%, ±10%, ±5%, or =1%. The term "substantially" is used to indicate that a result (e.g., measurement value) is close to a targeted value, where close can mean, for example, the result is within 80% of the value, within 90% of the value, within 95% of the value, or within 99% of the value.

While certain example embodiments have been described, these embodiments have been presented by way of example only, and are not intended to limit the scope of the inventions disclosed herein. Thus, nothing in the foregoing description is intended to imply that any particular feature or characteristic is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. An immersive display system comprising:
a first screen comprising a multilayer structure configured to diffusely reflect light in a first red wavelength band, a first green wavelength band, and a first blue wavelength band;
a second screen comprising a multilayer structure configured to diffusely reflect light in a second red wavelength band that does not overlap with the first red wavelength band, a second green wavelength band that does not overlap with the first green wavelength band, and a second blue wavelength band that does not overlap with the first blue wavelength band;
a third screen comprising a multilayer structure configured to diffusely reflect light in a third red wavelength band that does not overlap with the first or second red wavelength bands, a third green wavelength band that does not overlap with the first or second green wavelength bands, and a third blue wavelength band that does not overlap with the first or second blue wavelength bands;
a first projector system configured to project a first video onto the first screen, the first projector system configured to provide light within the first red wavelength band, the first green wavelength band, and the first blue wavelength band;
a second projector system configured to project a second video onto the second screen, the second projector system configured to provide light within the second red wavelength band, the second green wavelength band, and the second blue wavelength band; and
a third projector system configured to project a third video onto the third screen, the third projector system configured to provide light within the third red wavelength band, the third green wavelength band, and the third blue wavelength band,
wherein the first screen and the third screen are positioned adjacent to the second screen so that the first video, the second video, and the third video are configured to be simultaneously viewed by a plurality of viewers in an immersive viewing environment.

2. The immersive display system of claim 1, wherein:
the first projector system is further configured to not provide light in the second or third red wavelength bands, the second or third green wavelength bands, or the second or third blue wavelength bands,
the second projector system is further configured to not provide light in the first or third red wavelength bands, the first or third green wavelength bands, or the first or third blue wavelength bands, and
the third projector system is further configured to not provide light in the first or second red wavelength bands, the first or second green wavelength bands, or the first or second blue wavelength bands.

3. The immersive display system of claim 1, wherein:
the first screen is further configured to absorb light in the second and third red wavelength bands, the second and third green wavelength bands, and the second and third blue wavelength bands,
the second screen is further configured to absorb light in the first and third red wavelength bands, the first and third green wavelength bands, and the first and third blue wavelength bands, and
the third screen is further configured to absorb light in the first and second red wavelength bands, the first and second green wavelength bands, and the first and second blue wavelength bands.

4. The immersive display system of claim 3, wherein the absorption of the first screen is at least 90% in each of the second and third red wavelength bands, the second and third green wavelength bands, and the second and third blue wavelength bands.

5. The immersive display system of claim 4, wherein the absorption of the second screen is at least 90% in each of the first and third red wavelength bands, the first and third green wavelength bands, and the first and third blue wavelength bands.

6. The immersive display system of claim 5, wherein the absorption of the third screen is at least 90% in each of the first and second red wavelength bands, the first and second green wavelength bands, and the first and second blue wavelength bands.

7. The immersive display system of claim 1, wherein the absorption of the first screen is less than or equal to 5% in each of the first red wavelength band, the first green wavelength band, and the first blue wavelength band.

8. The immersive display system of claim 7, wherein the absorption of the second screen is less than or equal to 5% in each of the second red wavelength band, the second green wavelength band, and the second blue wavelength band.

9. The immersive display system of claim 8, wherein the absorption of the third screen is less than or equal to 5% in each of the third red wavelength band, the third green wavelength band, and the third blue wavelength band.

10. The immersive display system of claim 1, wherein the width of each of the first, second, and third red wavelength bands is less than or equal to about 10 nm.

11. The immersive display system of claim 1, wherein the width of each of the first, second, and third red wavelength bands is less than or equal to about 2% of the center wavelength of the respective wavelength band.

12. The immersive display system of claim 1, wherein a center wavelength of the first red wavelength band is about 630 nm, a center wavelength of the first green wavelength band is about 540 nm, and a center wavelength of the first blue wavelength band is about 465 nm.

13. The immersive display system of claim 12, wherein a center wavelength of the second red wavelength band is about 620 nm, a center wavelength of the second green wavelength band is about 530 nm, and a center wavelength of the second blue wavelength band is about 455 nm.

14. The immersive display system of claim 13, wherein a center wavelength of the third red wavelength band is about 610 nm, a center wavelength of the third green wavelength band is about 520 nm, and a center wavelength of the third blue wavelength band is about 445 nm.

15. The immersive display system of claim 1, wherein the first, second, and third screens are curved.

16. An immersive display system comprising:
    a first screen comprising:
        a first layer comprising an anti-reflection element or a glare suppression element configured to suppress specular reflections of light incident on the screen;
        a second layer comprising a first interference coating configured to reflect light in a red wavelength band;
        a third layer comprising a second interference coating configured to reflect light in a green wavelength band;
        a fourth layer comprising a third interference coating configured to reflect light in a blue wavelength band;
        a fifth layer comprising a light-absorbing element configured to absorb visible light; and
    a second screen positioned adjacent to the first screen, the second screen comprising:
        a first layer comprising an anti-reflection element or a glare suppression element configured to suppress specular reflections of light incident on the screen;
        a second layer comprising a first interference coating configured to reflect light in a second red wavelength band that does not overlap with the red wavelength band;
        a third layer comprising a second interference coating configured to reflect light in a second green wavelength band that does not overlap with the green wavelength band;
        a fourth layer comprising a third interference coating configured to reflect light in a second blue wavelength band that does not overlap with the blue wavelength band; and
        a fifth layer comprising a light-absorbing element configured to absorb visible light.

17. The immersive display system of claim 16, wherein at least one of the first and second screens further comprises a reflector positioned prior to the first layer on an optical path from a projector to the first screen.

18. The immersive display system of claim 17, wherein the reflector comprises a Fresnel reflecting surface comprising a set of flat annular sections wherein each flat surface is at a different angle.

19. The immersive display system of claim 16, wherein at least one of the first and second screen further comprises a structure of micro-lenses, wherein individual micro-lenses include a light diffusing element.

* * * * *